United States Patent [19]
Peschel et al.

[11] Patent Number: 5,719,655
[45] Date of Patent: Feb. 17, 1998

[54] SYSTEM FOR MAGNETICALLY ATTACHING TEMPLELESS EYEWEAR TO A PERSON

[75] Inventors: David K. Peschel, San Francisco; Alexander Z. Nosler, Palo Alto, both of Calif.

[73] Assignee: Nike, Inc., Beaverton, Oreg.

[21] Appl. No.: 652,963

[22] Filed: May 24, 1996

[51] Int. Cl.$^6$ ............................. G02C 5/14; G02C 1/00
[52] U.S. Cl. ............................. 351/111; 351/41
[58] Field of Search ............................. 351/111, 116, 351/153, 110, 140, 141, 158, 41

[56] References Cited

U.S. PATENT DOCUMENTS

| | | |
|---|---|---|
| 78,534 | 6/1868 | Moses . |
| D. 229,974 | 1/1974 | Wichers . |
| D. 354,970 | 1/1995 | Bolle . |
| 714,664 | 12/1902 | Briggs . |
| 715,533 | 12/1902 | Anderson . |
| 915,487 | 3/1909 | Savoie . |
| 2,066,519 | 1/1937 | Speidel . |
| 2,129,458 | 9/1938 | Ashley . |
| 2,196,872 | 4/1940 | Pomeranz . |
| 2,268,903 | 1/1942 | Shockey . |
| 2,537,047 | 1/1951 | Gatten . |
| 2,597,312 | 5/1952 | Gardissard et al. . |
| 3,563,640 | 2/1971 | Wise et al. . |
| 3,574,452 | 4/1971 | McLendon et al. . |
| 3,614,216 | 10/1971 | Rosenthal . |
| 3,701,592 | 10/1972 | Fernandez . |
| 3,944,344 | 3/1976 | Wichers . |
| 4,006,974 | 2/1977 | Resnick ........................ 351/41 |
| 4,152,051 | 5/1979 | Van Tiem et al. . |
| 4,196,981 | 4/1980 | Waldrop . |
| 4,240,718 | 12/1980 | Wichers . |
| 4,322,138 | 3/1982 | Minart . |
| 4,837,862 | 6/1989 | Heil . |
| 4,886,349 | 12/1989 | Willis . |
| 4,988,181 | 1/1991 | Riach, Jr. et al. ........................ 351/52 |
| 5,005,965 | 4/1991 | Walters . |
| 5,302,977 | 4/1994 | Markovitz et al. . |
| 5,321,444 | 6/1994 | Lin . |
| 5,389,981 | 2/1995 | Riach, Jr. et al. ........................ 351/158 |

FOREIGN PATENT DOCUMENTS 1262034  12/1960  France .

OTHER PUBLICATIONS

Advertisement for Porsche Design sunglasses, *Interview Magazine*, Feb. 1996.

*Primary Examiner*—Hung X. Dang
*Attorney, Agent, or Firm*—Shook, Hardy & Bacon L.L.P.

[57] ABSTRACT

In one aspect of the invention a templeless system of eyewear is provided for securing the eyewear to the head of a person. The eyewear has a lens assembly with a first coupling element secured to the lens assembly. A second coupling element is secured to the head of a person. The lens assembly is attached to the head of the person by attaching the first and second coupling elements. In another aspect of the invention, the first coupling element is a magnet and the second coupling element is a magnetically attractable member. The magnet attracts the magnetically attractable member, thus securing the lens assembly to the person's head. In yet another aspect of the invention, the first coupling element is a magnetically attractable member and the second coupling element is a magnet. In another aspect of the invention, a device is provided for magnetically coupling sportswear, such as eyewear, to a person. The device has an adhesive backing material for attaching the device to the person, with a flexible covering on top of the adhesive backing material. Sandwiched between the backing material and the flexible covering is a magnet. After the device is coupled to the person, the magnet in the device can thereafter be used to magnetically couple a piece of sports equipment to the person.

30 Claims, 2 Drawing Sheets

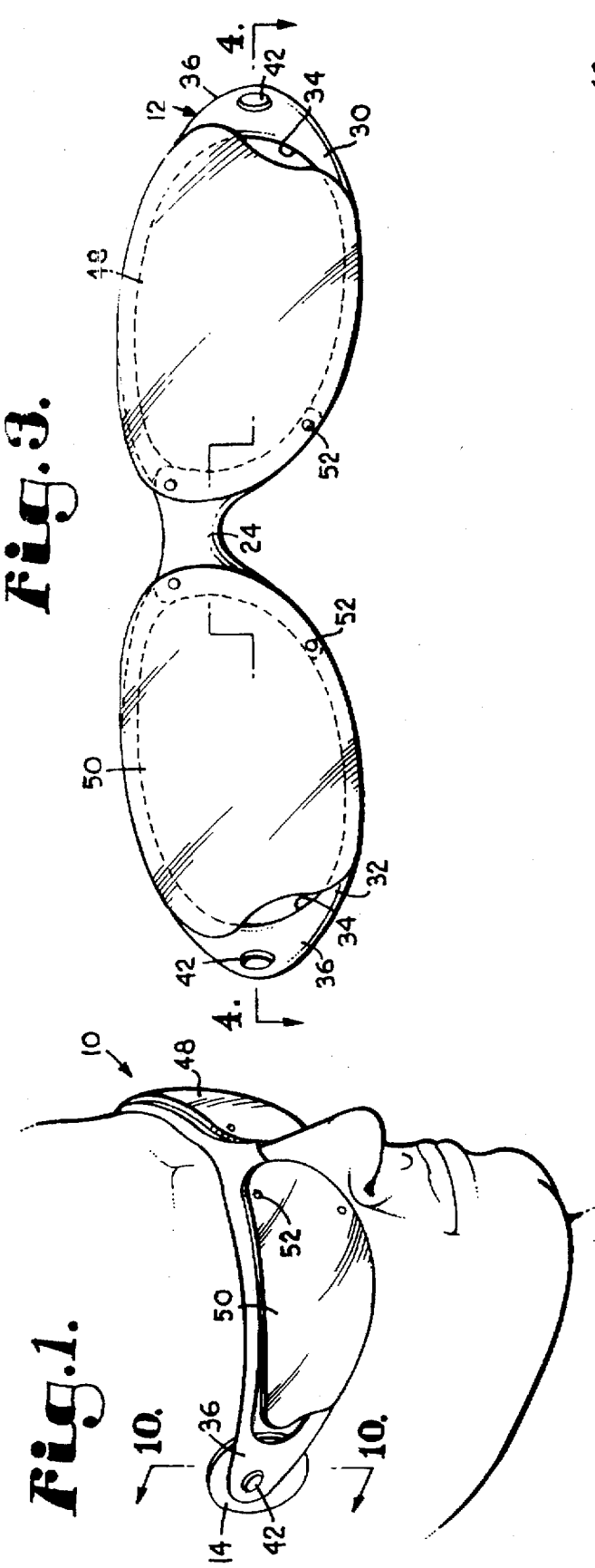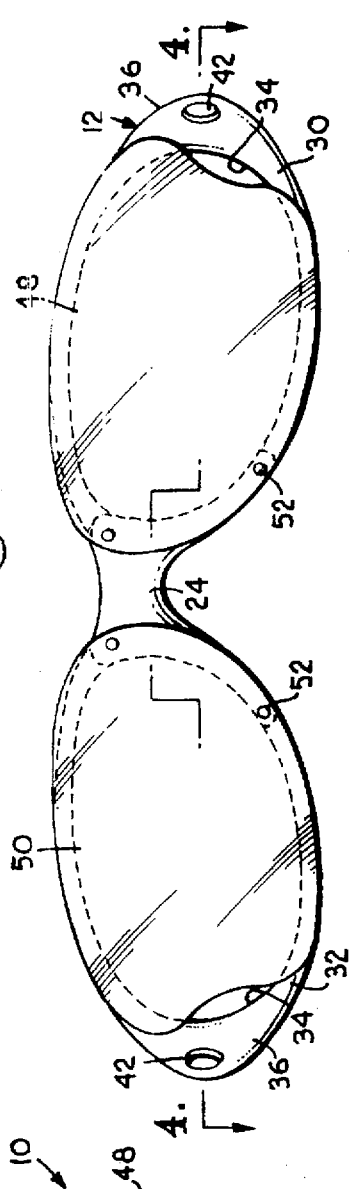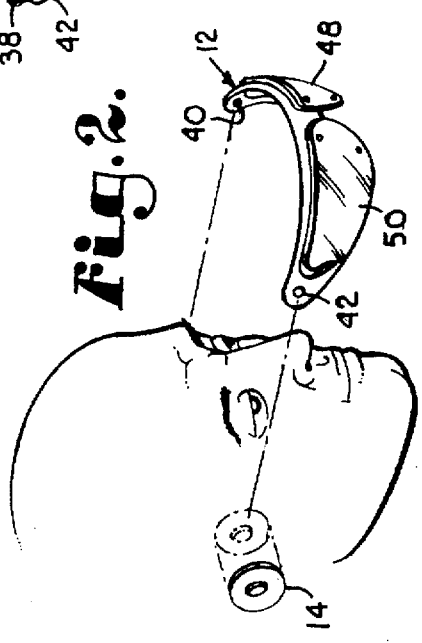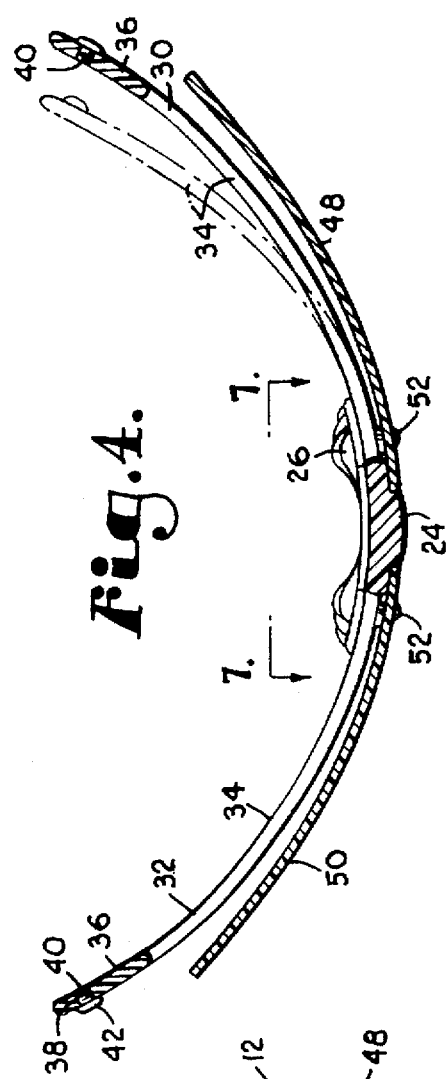

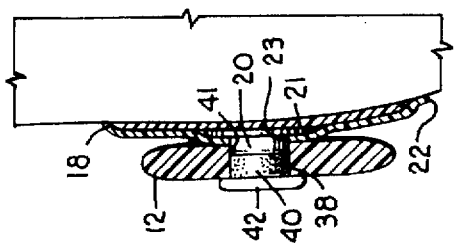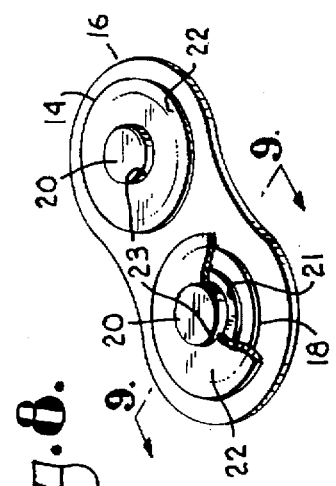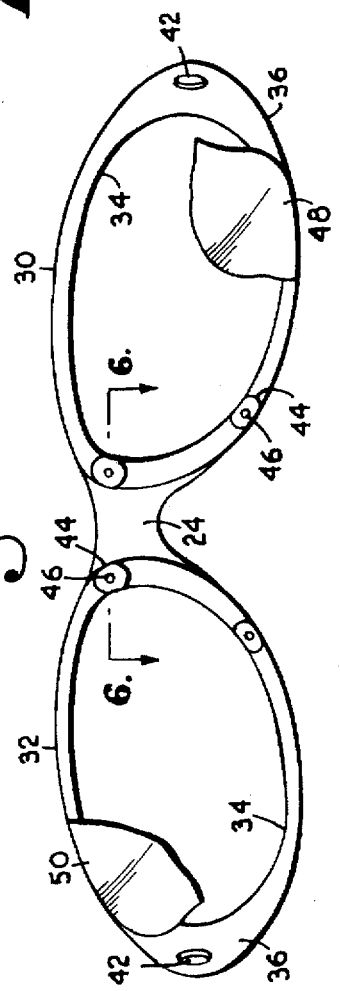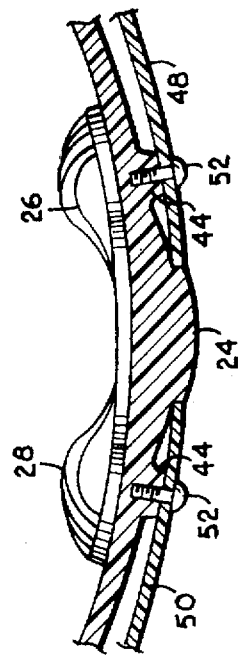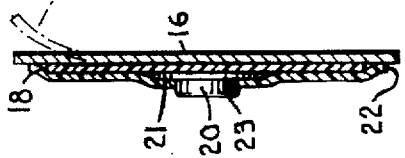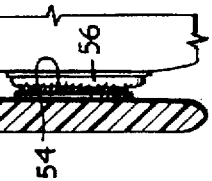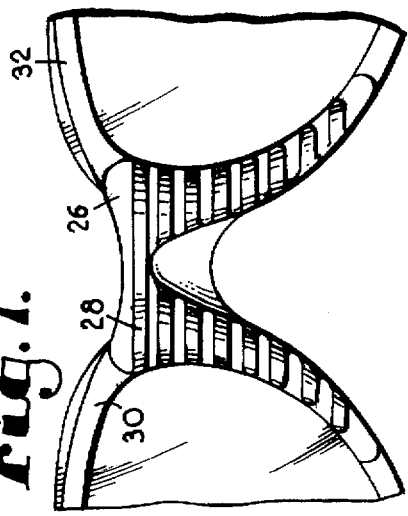

SYSTEM FOR MAGNETICALLY ATTACHING TEMPLELESS EYEWEAR TO A PERSON

BACKGROUND OF THE INVENTION

People have been wearing eyewear for hundreds of years. Eyewear is worn for a number of reasons, and is commonly worn today to correct a person's vision and to protect a person's eyes from the bothersome and harmful glare of the sun's rays. Throughout this specification, eyewear and eyeglasses are meant to include, by way of example and without limitation, glasses used for correctional purposes, and glasses used as sunglasses, as well as glasses used to protect a person's eyes from foreign objects.

Traditionally, eyeglass frames have had "temples." Temples are the side members that extend from the lens or lens frame along the side of the wearer's head. The temples usually terminate with a downward loop that is placed behind the wearer's ear. The temples are commonly hingedly connected to the frame so that the temples can be folded, which allows the glasses to be stored in a convenient fashion. Thus, temples have traditionally been used to maintain eyeglasses in position on a wearer's head.

The existence of temples on traditional eyewear presents a number of disadvantages, which have heretofore been tolerated because suitable alternatives for keeping the glasses in the proper position on the wearer's head did not exist. The temples often cause discomfort to the wearer by exerting pressure on the wearer's head in the area behind the ears. This pressure can become irritating to the wearer and can even cause permanent creases in the wearer's head. Further, the pressure can cause the wearer to suffer headaches and other discomfort. This pressure can be alleviated to some extent by selecting lightweight frames and by ensuring that the temples fit the wearer's head properly. However, the discomfort and irritation that are caused by the temples cannot be eliminated entirely without eliminating the temples.

Another disadvantage of the temples is that the temples of each piece of eyewear must be fitted to the wearer's head. Without a proper fit, the irritation and discomfort discussed above will be enhanced. Thus, a number of different sizes and shapes of eyeglass frames, having a number of different sizes and shapes of temples must be stocked to fit the variety of head sizes of the various wearers.

Yet another disadvantage of the temples stems from the fact that the temples are commonly attached to the frames of the eyeglasses with hinges. The hinges are necessary to allow the temples to be folded flat against the eyeglasses, thus providing a convenient storage position for the temples. These hinges, however, often become loose or broken. Therefore, the existence of temples increases the need for maintenance, which can be inconvenient and costly.

Temples also complicate the wearing of other headgear, such as a hat. When eyeglasses with temples are being worn, it is often difficult to fit a hat on the wearer's head in the same fashion as the hat would be worn without the wearing of eyeglasses.

Finally, the temples used to secure eyeglasses to the wearer's head do not always work satisfactorily. For instance, when the user is participating in an athletic event, the temples will often not work to satisfactorily maintain the glasses on the head of the wearer. Perspiration about the head of the wearer can cause the glasses to slide down the wearer's nose. Because perspiration also frequently exists behind the ears of the person, the temples often allow this sliding to occur. Consequently, many people use an additional strap that is connected to each of the temples and that extends around the back of the wearer's head to properly maintain the glasses in position. The strap is meant to prevent the glasses from sliding out of place on the wearer's head. While the strap helps to keep the glasses in position, the strap also increases the pressure exerted on the wearer's head, and thus can cause additional discomfort. The strap can also further interfere with the wearing of other headgear, such as a hat.

Therefore, an eyewear system is needed that obviates the need for temples on the frames of the eyewear. One attempt to alleviate the many problems caused by temples can be found in U.S. Pat. No. 4,886,349. This patent discloses eyeglasses that have wing portions extending from the lens frame. Attached to the wing portions is a piece of resilient foam. The foam exerts pressure on the temple area of the wearer's head, thus keeping the eyeglasses in place. This patent therefore discloses eyeglasses that do not have temples. The patent does not, however, solve many of the problems noted above. Because the foam pieces are compressed and therefore exert pressure on the wearer's head, the glasses may be uncomfortable to the wearer. The wearer may suffer from headaches due to the pressure exerted on the wearer's head. Further, the resilient foam pieces may not hold the eyeglasses in place on the wearer's head if the wearer is engaged in some type of physical activity. If additional pressure is used to correct this problem, the discomfort to the user will likely increase.

Therefore, a templeless eyewear system is needed that can be used to reliably and removably couple glasses to the head of a wearer. Further, an eyewear system is needed that eliminates the need for hinges which require frequent maintenance. A system of eyewear is also needed that eliminates the need to stock several different sizes of eyewear having different sizes and shapes of temples. Still further, a templeless eyewear system is needed that secures the eyewear to the head of a person with a sufficient fit to permit freedom of movement of the head without dislodging the eyewear from the person's head. Finally, a templeless eyewear system is needed that can be comfortably worn for extended periods of time and that does not exert pressure on the sides of the wearer's head.

SUMMARY OF THE INVENTION

It is an object of the present invention to provide a system for eyewear that allows the eyewear to be reliably and removably coupled to the head of a person without the need for temples.

A further object of this invention is to provide a system of eyewear that eliminates the need for hinges on the frames of the eyewear.

It is yet another object of this invention to provide a system of eyewear that eliminates the need for any part of the eyewear to extend rearwardly of the temple region and which therefore exerts no pressure on the person's head behind the person's ears.

It is a still further object of this invention to provide a system of eyewear that maintains the eyewear in a proper position on a wearer's head without the need for any temples or any additional straps that extend all of the way around a wearer's head.

It is another object of this invention to provide a system of eyewear that can be worn for extended periods of time without experiencing discomfort.

It is a further object of this invention to provide a templeless system of eyewear that can be used to removably couple the eyewear to a person's head with a sufficient fit to permit freedom of movement of the person's head without dislodging the eyewear.

According to one aspect of the present invention, the foregoing and other objects are obtained by a templeless system for securing eyewear to the head of a person that has a lens assembly. A first coupling element is secured to the lens assembly and a second coupling element is secured to the head of a person. The lens assembly is attached to the head of the person by attaching the first and second coupling elements. In another aspect of the invention, the first coupling element is a magnet and the second coupling element is a magnetically attractable member. The magnet attracts the magnetically attractable member, thus securing the lens assembly to the person's head. In yet another aspect of the invention, the first coupling element is a magnetically attractable member and the second coupling element is a magnet. In either of the above aspects of the invention, the magnetically attractable member may be a magnet. In still another aspect of the invention, the first and second coupling elements are opposing hook and loop fasteners.

In another aspect of the invention, a device is provided for magnetically coupling sportswear, such as eyewear, to a person. The device has an adhesive backing material for attaching the device to the person, with a flexible covering on top of the adhesive backing material. Sandwiched between the backing material and the flexible covering is a magnetically attractable member. A magnet that is coupled with a piece of sports equipment is used to couple the sports equipment to the person by attracting the magnetically attractable member. In yet another aspect of the invention, a magnet is sandwiched between the backing material and the flexible covering. After the device is coupled to the person, the magnet in the device can thereafter be used to magnetically couple a piece of sports equipment to the person.

Additional objects, advantages, and novel features of the invention will be set forth in part in the description which follows, and in part will become apparent to those skilled in the art upon examination of the following, or may be learned from practice of the invention. The objects and advantages of the invention may be realized and attained by means of the instrumentalities and combinations particularly pointed out in the appended claims.

BRIEF DESCRIPTION OF THE DRAWINGS

In the accompanying drawings which form a part of the specification and are to be read in conjunction therewith and in which like reference numerals are used to indicate like parts in the various views:

FIG. 1 is a perspective view of an eyewear system according to the present invention being worn by a person.

FIG. 2 is a perspective view of the eyewear of FIG. 1 with the system components shown detached from the person's head, and with one adhesive tab shown attached to the person's head in phantom lines.

FIG. 3 is a front elevation view of the frame and lens portion of the eyewear of FIG. 1.

FIG. 4 is a cross-sectional view taken along line 4—4 of FIG. 3, with a portion of the frame shown as flexing in phantom lines.

FIG. 5 is a front elevation view of the frame and lens portion of the eyewear of FIG. 1, similar to FIG. 3, with the lenses being broken away to show features of construction.

FIG. 6 is a cross-sectional view of the frame and lens portion of the eyewear of FIG. 1, taken along line 6—6 of FIG. 5.

FIG. 7 is a rear sectional view taken along line 7—7 of FIG. 4.

FIG. 8 is a perspective view of the adhesive tabs of the eyewear of FIG. 1, shown prior to use.

FIG. 9 is a cross-sectional view of the tabs of FIG. 8, taken along line 9—9 of FIG. 8, the removal of the kraft liner shown in phantom lines.

FIG. 10 is a cross-sectional view of the eyewear of FIG. 1, shown attached to the person's face, taken along line 10—10 of FIG. 1.

FIG. 11 is a view similar to FIG. 10, showing an alternative embodiment of the eyewear of FIG. 1 using opposing hook and loop fasteners.

DETAILED DESCRIPTION OF THE PREFERRED EMBODIMENTS

A system for securing eyewear to the head of a person embodying the principles of this invention is broadly designated in the drawings by the reference numeral 10, as shown in FIG. 1. Eyewear system 10 includes an eyeglass frame 12 and adhesive tabs 14. Tabs 14 are secured to the head of a person, and frame 12 is secured to tabs 14 as is more fully discussed below.

Tabs 14, as shown, are generally in the shape of a circle or an oval, but may be any shape and, as best shown in FIG. 8, are initially attached to a kraft liner 16. As can best be seen from FIGS. 9 and 10, liner 16 is removed prior to the use of tabs.14. Liner 16 acts to protect an adhesive backing material 18, which forms the first layer of tabs 14, from any contamination prior to the use of the tabs.

Adhesive backing material 18 contacts the skin of the person and acts to secure tabs 14 to the person. Backing material 18 should be such that it can be easily removed from kraft liner 16. Further, backing material 18 should form a secure bond with human skin, but should also allow tabs 14 to be removed from human skin without causing damage to the skin. One suitable adhesive backing material is a polyester fiber material with a hypoallergenic pressure-sensitive, medical grade acrylate adhesive, such as "ACUTEK Item No. 0196005" sold by Acutek of Inglewood, Calif. The adhesion of the backing material will preferably be a minimum of 31 oz. per inch to steel.

Generally disposed in the center of backing material 18 is a magnetically attractable member 20. Magnetically attractable member 20, as shown, is generally in the shape of a cylindrical disk with an annular flange 21 extending outwardly from a lower edge. However, member 20 may be any shape, and can be made from any material that is magnetically attractable, such as tin plated steel.

Disposed on top of backing material 18 and magnetically attractable member 20 is flexible covering 22. Covering 22 has an aperture 23 formed therein for receiving member 20 and is bonded to flange 21 and backing material 18 by a suitable adhesive. Covering 22 can slightly overlap the perimeter of backing 18 as shown in FIG. 9. Covering 22 and backing 18 thus act to ensure that magnetically attractable member 20 remains in the proper position within tabs 14 by sandwiching flange 21 therebetween. Covering 22 may be decoratively printed, such as with a design or company logo. A suitable material for covering 22 is an elastic polyurethane material with a hypoallergenic, medical grade acrylate adhesive on the side facing flange 21, such as "ACUTEK Item No. 1095011 (3M9906W)," sold by Acutek of Inglewood, Calif.

As is apparent from the drawings, eyeglass frame 12 lacks the conventional temples customarily associated with eyeglass frames. Eyeglass frame 12 has a curved or head engaging shape. This form of eyewear is variously described as panoramic or wrap-around. Eyeglass frame 12 should be made of a light-weight, rigid material. Nylon 4/12 has been found to be a suitable material for eyeglass frame 12.

Eyeglass frame 12 is bilaterally symmetrical about a centrally disposed nose bridge section 24. Nose bridge section 24 is preferably formed integrally with frame 12. A nosepiece 26 is attached to nose bridge section 24. As best shown in FIG. 6, nosepiece 26 extends slightly rearwardly from nose bridge section 24. Nosepiece 26 is made of a material that is softer than the material used for frame 12, thus enhancing the comfort of the wearer. Nosepiece 26 is attached to nose bridge 24 with any suitable attaching means, such as an adhesive. Nosepiece 26 preferably has ribs 28 disposed thereon, as can best be seen in FIGS. 6 and 7. Ribs 28 further enhance the comfort to the wearer and provide frame 12 with superior gripping power so that frame 12 is more likely to stay in the proper position on the wearer's head, and specifically in the proper position on the wearer's nose. Because nosepiece 26, and ribs 28 thereon, are made of a softer material than that used for frame 12, ribs 28 are flexible. This flexibility allows nosepiece 26 to better conform to the nose of the individual wearer, thus providing a better fit. Ribs 28 provide an avenue for ventilation, which again enhances the comfort of the wearer.

Extending from nose bridge section 24 is a left rim section 30 and a right rim section 32. As stated above, nose bridge section 24, rim section 30 and rim section 32 may all be formed integrally as one piece. Nose bridge section 24, left rim section 30 and right rim section 32 form a continuous arcuate frame 12 that is curved to fit the shape of a person's head. As can be seen with reference to FIGS. 3 and 5, left rim section 30 and right rim section 32 define openings 34. Rim sections 30 and 32 are shaped and sized to maximize openings 34 such that the wearer's vision is not impaired.

Distal from nose bridge section 24 on left rim section 30 and right rim section 32 are terminal ends 36. Left and right rim sections 30 and 32 are of such a length and shape that terminal ends 36 are substantially located on the sides of a wearer's head adjacent the temple region of the wearer's head. Each terminal end 36 has a bore 38 extending therethrough, as seen in FIG. 10. Mounted to each terminal end 36, through bore 38 is a magnet 40. Magnet 40 is preferably in the shape of a cylindrical disk. Magnet 40 should be of sufficient strength to hold the desired object, in this case frame 12, in position on the wearer's head. It has been found that a magnet having an attachment force of 0.72 pounds is sufficient. Further, the residual induction of magnet 40 is preferably 12200 gauss. A grade 35 Neodymium magnet having an nickel coating has been found to be suitable for holding the eyewear in position on the head of a person. One suitable magnet is a "PW96-0523-001" magnet manufactured by Dexter Magnetic Materials of Fremont, Calif. Magnets 40 are attached to frame 12 within bore 38 by a suitable adhesive. As shown in FIG. 10, magnet 40 is preferably slightly recessed from the outer surface of the inside of frame 12 to form a generally cylindrical recess 41 for receiving the exposed end of the respective member 20 as will be more fully described. A decorative cap 42 can be placed over bore 38 on the exterior of frame 12, thereby hiding magnet 40 from view. Optionally, left and right rim sections 30 and 32 may be formed around each member 40, thus holding magnets 40 in place.

Extending outwardly from left and right rim sections 30 and 32 are lens platforms 44. As shown in FIG. 5, there are preferably two lens platforms 44 on left rim section 30, and two lens platforms 44 on right rim section 32. Preferably, lens platforms 44 are formed adjacent nose bridge 24 and are formed integrally with frame 12. Lens platforms 44 protrude slightly forwardly from left and right rim sections 30 and 32 to provide a mounting surface. Each lens platform 44 has a center pilot hole 46.

Mounted to frame 12 are a left lens 48 corresponding to left rim section 30 and a right lens 50 corresponding to right rim section 32. Lenses 48 and 50 can be made of any suitable lens material, such as polycarbonate, as is well known to those skilled in the art. Further, lenses 48 and 50 may be made of a material that effectively shades the eyes of the wearer from the sun's rays. Left lens 48 is mounted to left rim section 30 on lens platforms 44. Screws 52 are passed through left lens 48 and into pilot holes 46, thereby securing left lens 48 to left rim section 30. Right lens 50 is similarly mounted to right rim section 32. Left and right lenses 48 and 50 are shaped to substantially cover left and right rim sections 30 and 32, respectively. However, as best seen in FIGS. 1 and 4, lenses 48 and 50 are spaced away from left and right rim sections 30 and 32. The spacing between lenses 48 and 50 and rim sections 30 and 32 allows air to flow between the lenses and the rim sections. Further, lenses 48 and 50 may be sized and shaped so that they do not cover openings 34 completely. Shaping and sizing of lenses 48 and 50 in this fashion increases the air flow around the eyes of the wearer. This air flow increases the comfort of the wearer and increases the likelihood that fog or condensation will not form on lenses 48 and 50.

As stated previously, lens platforms 44 are preferably mounted adjacent nose bridge section 24. Thus, lenses 48 and 50 are mounted to frame 12 adjacent nose bridge section 24. Because lenses 48 and 50 are mounted adjacent nose bridge section 24, terminal ends 36 can be flexed inwardly to fit an individual wearer's head without affecting the optics of lenses 48 and 50. In other words, it may be necessary to flex terminal ends 36 inwardly to fit a wearer's head. If this is done, as can be seen in phantom lines in FIG. 4, lenses 48 and 50 will remain in substantially the same position in relation to the wearer's head because lenses 48 and 50 are mounted to frame 12 only adjacent the centrally disposed nose bridge section 24. Therefore, the optics of lenses 48 and 50 remain unaffected by movement of terminal ends 36 on frame 12.

When a person desires to use eyewear system 10, the person will first clean the dirt, sweat and other foreign material from the temple region of his or her head to improve adhesion of adhesive tabs 14. The person will then remove adhesive tabs 14 from kraft liner 16. Tabs 14 are then magnetically coupled to eyeglass frame 12 by placing the exposed portions of magnetically attractable members 20 in respective apertures 41 so that they contact respective magnets 40. Frame 12, with adhesive tabs 14 attached thereto, is thereafter mounted to the face of the person. Frame 12 is placed on the person so that the person's nose engages nosepiece 26. Pressure is then applied to tabs 14 to bond tabs 14 to the temple region of the person's head. As stated previously, terminal ends 36 may be flexed inwardly to fit the wearer's head without affecting the optics of lenses 48 and 50. Eyeglass frame 12 is thereafter capable of being repetitiously removed and reattached to tabs 14 by coupling and uncoupling magnetically attractable members 20 with magnets 40. Adhesive tabs 14 remain in place on the person's head. When eyewear system 10 is no longer desired to be used, tabs 14 are removed from the person's head and discarded. Upon the next use of eyewear system 10, a new set of tabs 14 will be used, along with the same frame 12 as was used previously.

In another embodiment of the invention, magnetically attractable members 20 are attached to terminal ends 36 on frame 12, and magnets 40 are disposed between backing material 18 and flexible covering 22. As can readily be seen, the operation of eyewear system 10 is unaffected by reversing the positions of magnetically attractable members 20 and magnets 40. Further, magnetically attractable members 20 may be magnets in any of the above embodiments.

While magnetic members are described above for coupling eyewear to a wearer's head, it should be understood that other structures could be used for coupling tabs 14 and frame 12, such as opposing hook and loop fasteners or snaps. As best seen in FIG. 11, in the hook and loop fastener embodiment one part 54 of the hook and loop fastener is attached to the inside of frame 12 in the same general area as described above for magnet 40. Bore 38 is not required in this embodiment. The second part 56 of the hook and loop fastener is adhesively attached to the person, in a manner similar to that described above for tabs 14. Frame 12 is thereafter detachably secured to tabs 14.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, what is claimed is:

1. A templeless frame system for eyewear, comprising:
   an eyeglass frame having a nose bridge and left and right rim sections extending from the nose bridge and curving so as to wrap around to at least the temple region of a wearer ;and
   means for magnetically coupling the frame to means attached to the head of the wearer.

2. The system of claim 1 wherein the frame coupling means includes a magnet operatively attached to the frame; and wherein the head attachment means includes a tab having one of a magnet and a magnetically attractable member attached thereto, the tab being configured to be adhesively attached to the head of the wearer so that the magnet operatively attached to the frame is coupled to the one of the magnet and the magnetically attractable member attached to the tab to maintain the frame in position on the head of the wearer.

3. The system of claim 2 wherein each rim section ends in a terminal end distal from the nose bridge, and wherein a lens is attached to the frame adjacent the nose bridge so that the terminal ends of the left and right rim sections are laterally movable in a plane perpendicular to the plane of the wearer's face independently of the lens.

4. The system of claim 2 wherein a lens includes a left lens and a right lens that are attached to the left and right rim sections adjacent the nose bridge, and wherein the left and right lenses are spaced away from the frame distal from the nose bridge so that air flows between the lenses and the frame.

5. The system of claim 2 wherein a lens includes a left lens and a right lens that are attached to the left and right rim sections adjacent the nose bridge, and wherein the left and right rim sections, when the eyewear is worn by the wearer, extend arcuately around the front of the head of the wearer and have terminal ends rearward of the eyes of the wearer, and wherein the magnet is attached to each terminal end, and wherein, when the eyewear is worn by the wearer, the tabs are adhesively mounted to the temple region on the head of the wearer at a location corresponding to the magnets mounted in the terminal ends.

6. The frame system of claim 1 wherein the frame coupling means includes one of a magnet and a magnetically attractable member operatively attached to the frame; and wherein the head attachment means includes a tab having a magnet attached thereto, the tab being configured to be adhesively attached to the head of the wearer so that the magnet is coupled to the one of the magnet and the magnetically attractable member to maintain the frame in position on the head of the wearer.

7. The system of claim 6 wherein each rim section ends in a terminal end distal from the nose bridge, and wherein it lens is attached to the frame adjacent the nose bridge so that the terminal ends of the left and right rim sections are laterally movable in a plane perpendicular to the plane of the wearer's face independently of the lens.

8. The system of claim 6 wherein a lens includes a left lens and a right lens that are attached to the left and right rim sections adjacent the nose bridge, and wherein the left and right lenses are spaced away from the frame distal from the nose bridge so that air flows between the lenses and the frame.

9. The system of claim 6 wherein a lens includes a left lens and a right lens that are attached to the left and right rim sections adjacent the nose bridge, and wherein the left and right rim sections, when the eyewear is worn by the wearer, extend arcuately around the front of the head of the wearer and have terminal ends rearward of the eyes of the wearer, and wherein the one of the magnet and the magnetically attractable member is attached to each terminal end, and wherein, when the eyewear is worn by the wearer, the tabs are adhesively mounted to the temple region on the head of the wearer at a location corresponding to the one of the magnets and the magnetically attractable members mounted in the terminal ends.

10. The system of claim 1 wherein the nose bridge includes a nosepiece made of a material softer than the frame and provided with flexible fibs to enable the nosepiece to better conform to the nose of the wearer.

11. A system for securing eyewear including a lens assembly to the head of a wearer, comprising:
    a first coupling element attached to the lens assembly; and
    a second coupling element configured to be secured to the head of the wearer;
    wherein the lens assembly includes at least one lens and a nose bridge and left and right rim sections extending from the nose bridge and curving so as to wrap around to at least the temple region of the wearer; and
    wherein in use the first coupling element is detachably attached to the second coupling element to secure the eyewear to the wearer's head.

12. The system of claim 11 wherein the first coupling element is a magnet and the second coupling element is one of a magnet and a magnetically attractable member.

13. The system of claim 11 wherein the first coupling element is one of a magnet and a magnetically attractable member and the second coupling element is a magnet.

14. The system of claim 11 wherein the first coupling element and the second coupling element comprise a hook and loop fastener.

15. The system of claim 11 wherein at least one lens and a frame having a bridge and left and right rim sections extending from the each rim section ends in a terminal end distal from the nose bridge, and wherein the lens is attached to the frame adjacent the nose bridge so that the terminal ends of the left and right rim sections are laterally movable in a plane perpendicular to the plane of the wearer's face independently of the lens.

16. The system of claim 15 wherein the lens is spaced away from the frame distal from the nose bridge so that air flows between the lens and the frame.

17. The system of claim 15 wherein the first coupling element is attached to the frame.

18. The system of claim 11 wherein each rim section ends in a terminal end distal from the nose bridge, and a left and a right lens each attached to the frame adjacent the nose bridge, and wherein the first coupling element is attached to the terminal ends of the rim sections, and wherein the second coupling element is configured to be adhesively attached to the temple region on the head of the wearer, the temple region corresponding to the location of the first coupling elements.

19. The system of claim 11 wherein the nose bridge includes a nosepiece made of a material softer than the frame and provided with flexible ribs to enable the nosepiece to better conform to the nose of the wearer.

20. A templeless frame system for eyewear, comprising:
an eyeglass frame shaped to the general curvature of the temples of a wearer, said frame having a nose bridge and left and right rim sections extending from the nose bridge, each section having a terminal end that extends rearward of the associated eye of the wearer;
a pair of first coupling elements, each coupling element configured to be attached to one of the terminal ends of the frame, wherein each first coupling element is one of a magnet and a magnetically attractable member;
a pair of second coupling elements being configured to be adhesively attached to the temple regions of the head of the wearer at locations corresponding to the first coupling elements mounted to the terminal ends so as to maintain the frame in position on the head of the wearer, wherein each second coupling element is one of a magnet and a magnetically attractable member; and
means for aligning each first coupling element with its associated second coupling element to inhibit lateral movement of the first coupling element with respect to its associated second coupling element.

21. The system of claim 20, wherein the aligning means includes a recess formed in each of the terminal ends, each first coupling element located generally at the bottom of one of the recesses such that each second coupling element is received in its associated recess adjacent its associated first coupling element to ensure alignment of the first coupling element with respect to the second coupling element so that the frame is maintained in position on the wearer's face.

22. The system of claim 21, wherein each first coupling element directly contacts its associated second coupling element.

23. The system of claim 20, wherein each second coupling element includes an adhesive backing material for adhesively attaching the frame to the wearer and a flexible covering disposed on top of the adhesive backing material, wherein the one of the magnet and the magnetically attractable member of the second coupling element is disposed between the backing material and the covering.

24. The system of claim 23, wherein each second coupling element further includes a kraft liner initially disposed on the adhesive backing material, the liner acting to protect the backing material until the backing material is ready for use, the liner being removed from the backing material immediately prior to attaching the device to the wearer.

25. The system of claim 24, wherein the one of the magnet and magnetically attractable member of the second coupling element has a portion that extends through an aperture within the covering, the portion contacting the first coupling element and the aligning means to allow positioning and attachment of the frame to the wearer's face.

26. The system of claim 20, wherein a left lens and a right lens are attached, respectively, to the left and right rim sections adjacent the nose bridge, and wherein the left and right lenses are spaced away from the frame distal from the nose bridge so that the terminal ends of the left and right rim sections are movable laterally in a plane perpendicular to the plane of the wearer's face independently of the lenses so as to not distort the optics of the lenses.

27. A templeless frame system for eyewear, comprising:
an eyeglass frame shaped to the general curvature of the temples of a wearer, the frame having a nose bridge and left and right rim sections extending from the nose bridge, each section having a terminal end that extends rearward of the associated eye of the wearer;
a pair of first coupling elements, each coupling element configured to be attached to one of the terminal ends of the frame, wherein each first coupling element is one of a magnet and a magnetically attractable member;
a pair of second coupling elements configured to be adhesively attached to the temple regions of the head of the wearer at locations corresponding to the first coupling elements mounted to the terminal ends so as to maintain the frame in position on the head of the wearer, wherein each second coupling element is one of a magnet and a magnetically attractable member; and
wherein each second coupling element includes an adhesive backing material for adhesively attaching the frame to the wearer, and a flexible covering disposed on top of the adhesive backing material, wherein the one of the magnet and the magnetically attractable member is disposed between the backing material and the covering.

28. The system of claim 27, wherein each second coupling element further includes a kraft liner initially disposed on the adhesive backing material, the liner acting to protect the backing material until the backing material is ready for use, the liner being removed from the backing material immediately prior to attaching the frame to the wearer.

29. The system of claim 27, wherein one of the magnet and the magnetically attractable member of the second element has a portion that extends through an aperture in the covering such that the portion is in direct contact with its associated first coupling element.

30. The system of claim 27, further including a left lens and a right lens that are attached, respectively, to the left and right rim sections adjacent the nose bridge so that the terminal ends of the left and right rim sections may be moved laterally in a plane perpendicular to the plane of the wearer's face independently of the lenses.

* * * * *